(12) United States Patent
Chou et al.

(10) Patent No.: US 9,062,398 B2
(45) Date of Patent: Jun. 23, 2015

(54) NON-WOVEN FABRIC, METHOD FOR FABRICATING NON-WOVEN FABRIC, AND GAS GENERATION APPARATUS

(75) Inventors: Po-Kuei Chou, Hsinchu County (TW); Wei-Yi Yen, Hsinchu County (TW); Din-Sun Ju, Hsinchu County (TW); Tsai-Hsin Cheng, Hsinchu County (TW); Cheng Wang, Hsinchu County (TW)

(73) Assignee: YOUNG GREEN ENERGY CO., Hsinchu County (TW)

( * ) Notice: Subject to any disclaimer, the term of this patent is extended or adjusted under 35 U.S.C. 154(b) by 859 days.

(21) Appl. No.: 13/326,335

(22) Filed: Dec. 15, 2011

(65) Prior Publication Data

US 2012/0171089 A1    Jul. 5, 2012

(30) Foreign Application Priority Data

Jan. 4, 2011  (CN) .......................... 2011 1 0003933

(51) Int. Cl.
| | |
|---|---|
| B01J 7/00 | (2006.01) |
| C01B 3/08 | (2006.01) |
| D04H 1/413 | (2012.01) |
| D04H 1/541 | (2012.01) |

(52) U.S. Cl.
CPC ............. *D04H 1/413* (2013.01); *Y10T 442/641* (2015.04); *Y10T 442/658* (2015.04); *D04H 1/541* (2013.01)

(58) Field of Classification Search
CPC combination set(s) only.
See application file for complete search history.

(56) References Cited

U.S. PATENT DOCUMENTS

| | | | |
|---|---|---|---|
| 3,158,993 A * | 12/1964 | Hodgson | ........................ 60/214 |
| 5,998,057 A | 12/1999 | Koschany et al. | |
| 6,746,496 B1 | 6/2004 | Kravitz et al. | |
| 7,036,616 B1 * | 5/2006 | Kejha | ........................ 429/532 |
| 7,056,581 B2 | 6/2006 | Zhou et al. | |
| 7,306,780 B1 | 12/2007 | Kravitz et al. | |
| 7,435,274 B2 * | 10/2008 | Suenaga et al. | ............. 48/127.9 |
| 7,803,349 B1 * | 9/2010 | Muradov | ...................... 423/657 |
| 8,404,212 B2 * | 3/2013 | Norton et al. | .............. 423/648.1 |
| 2004/0016769 A1 * | 1/2004 | Redmond | ........................ 222/3 |
| 2004/0023087 A1 * | 2/2004 | Redmond | ........................ 429/19 |
| 2007/0128434 A1 | 6/2007 | Motoda et al. | |
| 2008/0233462 A1 | 9/2008 | Curello et al. | |

(Continued)

FOREIGN PATENT DOCUMENTS

| | | |
|---|---|---|
| CN | 1202984 A | 12/1998 |
| CN | 101232101 A | 7/2008 |

(Continued)

OTHER PUBLICATIONS

"First Office Action of China Counterpart Application", issued on Sep. 29, p. 1-p. 13, in which the listed references were cited.

*Primary Examiner* — Kaity Handal
(74) *Attorney, Agent, or Firm* — Jianq Chyun IP Office

(57) ABSTRACT

A non-woven fabric for reacting with a liquid to produce a gas is provided. The non-woven fabric includes at least one non-woven fabric fiber, a plurality of hot melt particles, and a plurality of solid particles. The non-woven fabric fiber has a first melting point. The hot melt particles are bonded with the non-woven fabric fiber and have a second melting point, in which the first melting point is higher than the second melting point. At least a part of the solid particles are bonded with the hot melt particles. Moreover, a method for fabricating the non-woven fabric and a gas generation apparatus using the non-woven fabric are also provided.

21 Claims, 7 Drawing Sheets

(56) References Cited

U.S. PATENT DOCUMENTS

| | | |
|---|---|---|
| 2008/0318116 A1 | 12/2008 | Kimura et al. |
| 2009/0098421 A1* | 4/2009 | Mills .............................. 429/17 |
| 2009/0113795 A1* | 5/2009 | Eickhoff ......................... 48/116 |
| 2010/0206804 A1 | 8/2010 | Weber et al. |
| 2011/0114075 A1* | 5/2011 | Mills ........................ 126/263.01 |
| 2011/0171119 A1* | 7/2011 | Yazami ......................... 423/657 |

FOREIGN PATENT DOCUMENTS

| | | |
|---|---|---|
| DE | 102006032035 A1 | 1/2008 |
| JP | 2004115980 A | 4/2004 |
| JP | 2007-12463 A | 1/2007 |
| JP | 4185748 B2 | 11/2008 |
| TW | I237710 | 8/2005 |
| TW | I296296 | 5/2008 |

* cited by examiner

NON-WOVEN FABRIC, METHOD FOR FABRICATING NON-WOVEN FABRIC, AND GAS GENERATION APPARATUS

CROSS-REFERENCE TO RELATED APPLICATION

This application claims the priority benefit of China application serial no. 201110003933.2, filed on Jan. 4, 2011. The entirety of the above-mentioned patent application is hereby incorporated by reference herein and made a part of this specification.

BACKGROUND OF THE INVENTION

1. Field of the Invention

The invention generally relates to a non-woven fabric, a method for fabricating the non-woven fabric, and a gas generation apparatus, in particular, to a non-woven fabric having solid particles, a method for fabricating the non-woven fabric, and a gas generation apparatus using the non-woven fabric.

2. Description of Related Art

A fuel cell (FC) is a power generation apparatus that converts chemical energy into electrical energy. For instance, according to an operating principle of a proton exchange membrane FC, hydrogen gas is oxidized at an anode catalyst layer to produce hydrogen ions ($H^+$) and electrons ($e^-$), or methanol and water are oxidized at the anode catalyst layer to produce hydrogen ions ($H^+$), Carbon Dioxide ($CO_2$), and electrons ($e^-$). The hydrogen ions ($H^+$) may be transferred to a cathode through the proton exchange membrane, and electrons may be firstly transferred to a load through an external circuit and then transferred to the cathode. At this time, a reduction reaction occurs between oxygen gas supplied to the cathode end and hydrogen ions ($H^+$) and electrons ($e^-$) at a cathode catalyst layer to produce water. The fuel (e.g., hydrogen gas) required by the anode may be obtained by a solid Sodium Borohydride ($NaBH_4$) hydrogen storage technique, for example, adding water into the solid Sodium Borohydride ($NaBH_4$) to produce the hydrogen gas.

To reduce the volume of the fuel, the solid Sodium Borohydride ($NaBH_4$) is pressed into a tablet, so the water permeates the solid Sodium Borohydride ($NaBH_4$) tablet slowly. When the water amount is insufficient, the water could only react with the solid Sodium Borohydride ($NaBH_4$) tablet on the surface but not enter the tablet, which reduces the efficiency of producing the hydrogen gas. Furthermore, the produced hydrogen gas may form bubbles on the surface of the solid Sodium Borohydride ($NaBH_4$), the water is difficult to permeate into the solid $NaBH_4$ tablet. In addition, after a part of the solid Sodium Borohydride ($NaBH_4$) tablet reacts with water, the overall structure is deformed and consequently the passage for the hydrogen gas exhausted from inside the solid Sodium Borohydride ($NaBH_4$) tablet is changed. Thus, the rate of generating the hydrogen gas is unstable.

Taiwan Patent No. I296296 discloses a technique of dipping a fiber into a solution containing additives to make the additives attached to the fiber. U.S. Patent No. 60/303,102 discloses a fiber, which has a core and a sheath that surrounds the core. U.S. Pat. No. 6,746,496 discloses a hydrogen gas generator for a power supply, in which micro-disperse particles contain a catalyst for reacting with water to produce hydrogen gas. US Publication No. 20080233462 discloses a solid fuel cartridge, which is fabricated by multiple layers.

SUMMARY OF THE INVENTION

The invention is directed to a non-woven fabric for reacting with a liquid to produce a gas.

The invention is also directed to a method for fabricating a non-woven fabric to obtain the non-woven fabric reacting with a liquid to produce a gas.

The invention is further directed to a gas generation apparatus capable of improving the gas generation efficiency.

The objectives and advantages of the invention can be further understood from the technical features disclosed in the invention.

To achieve one, a part of, or all of the above objectives, a non-woven fabric is disclosed in an embodiment of the invention, which reacts with a liquid to produce a gas. The non-woven fabric includes at least one non-woven fabric fiber, a plurality of hot melt particles, and a plurality of solid particles. The non-woven fabric has a first melting point. The hot melt particles are bonded with the non-woven fabric fiber and have a second melting point, in which the first melting point is higher than the second melting point. At least a part of the solid particles are bonded with the hot melt particles.

To achieve one, a part of, or all of the above objectives, a method for fabricating a non-woven fabric is disclosed in an embodiment of the invention. The non-woven fabric reacts with a liquid to produce a gas fuel. The method includes: providing at least one non-woven fabric fiber, in which the non-woven fabric fiber has a first melting point; bonding a plurality of hot melt particles with the non-woven fabric fiber, in which the hot melt particles have a second melting point, and the first melting point is higher than the second melting point; bonding a plurality of solid particles with the hot melt particles; and shaping the non-woven fabric fiber.

To achieve one, a part of, or all of the above objectives, a gas generation apparatus is disclosed in an embodiment of the invention. The gas generation apparatus includes a containing tank, at least one non-woven fabric unit, and a guiding structure. The containing tank is used for containing a liquid. The non-woven fabric unit includes at least one non-woven fabric fiber, a plurality of hot melt particles, and a plurality of solid particles. The non-woven fabric fiber has a first melting point. The hot melt particles are bonded with the non-woven fabric fiber and have a second melting point, in which the first melting point is higher than the second melting point. At least a part of the solid particles are bonded with the hot melt particles. The guiding structure is configured between the containing tank and the non-woven fabric unit for guiding the liquid from the containing tank to the non-woven fabric unit, and the liquid reacts with the solid particles to produce a gas.

Based on the above description, in the above embodiments of the invention, the hot melt particles are bonded with the non-woven fabric fiber and the solid particles are bonded with the hot melt particles. Thus, the hot melt particles, the non-woven fabric fiber, and the solid particles together form the non-woven fabric. When the liquid is guided to the non-woven fabric, the liquid directly reacts with the solid particles of the non-woven fabric, thus improving the gas generation efficiency. Furthermore, pores of the non-woven fabric remain unchanged in the structure during a reaction, the passage for the gas exhausted from the non-woven fabric also remains unchanged, and the gas generation rate is more stable.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
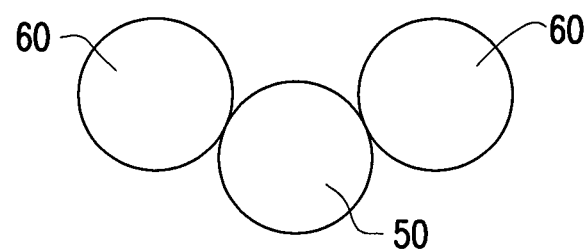
FIGS. 1A to 1E are flow charts of a method for fabricating a non-woven fabric according to an embodiment of the invention.
Figure 1B:
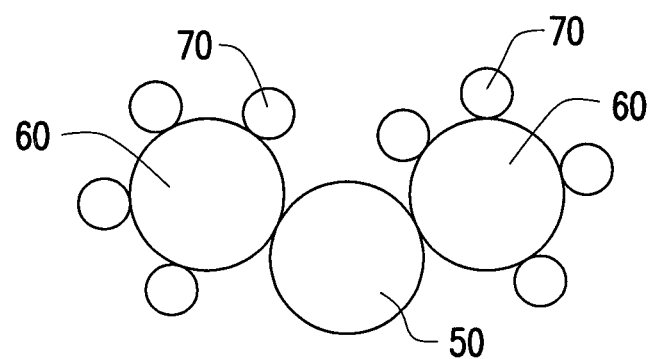

FIGS. 1A to 1E are flow charts of a method for fabricating a non-woven fabric according to an embodiment of the invention, in which the non-woven fabric reacts with a liquid to produce hydrogen gas. Referring to FIG. 1A, firstly, one or more non-woven fabric fibers 50 are provided, and a plurality of hot melt particles 60 are distributed on the non-woven fabric fiber 50. Referring to FIG. 1B, a plurality of solid particles 70 are distributed on the hot melt particles 60. It should be noted that, for the purpose of clarity, only one non-woven fabric fiber 50 is drawn in FIG. 1A and FIG. 1B.

Figure 1C:
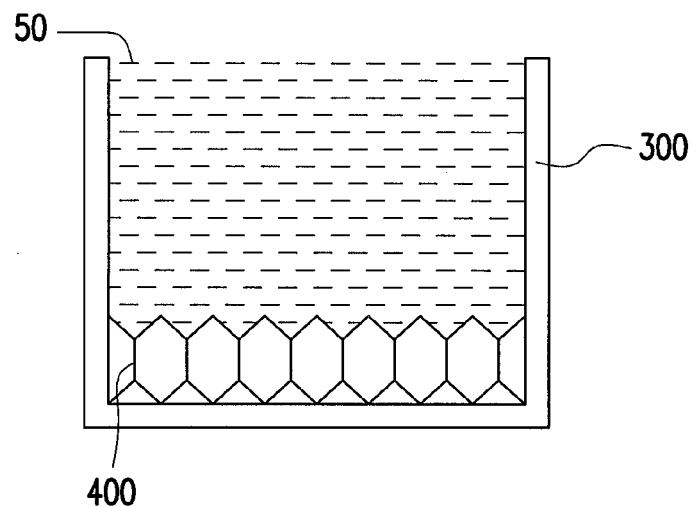
Figure 1D:
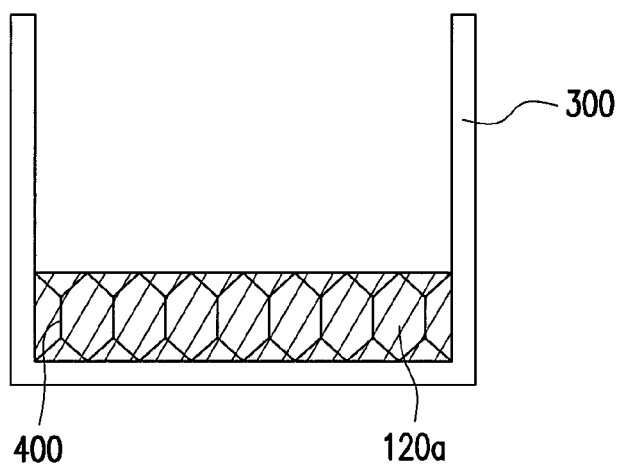

Referring to FIG. 1C, the non-woven fabric fibers 50 with the hot melt particles 60 and the solid particles 70 are placed inside a mold 300. In FIG. 1D, the non-woven fabric fibers 50 are molded in a frame 400 of the mold 300 to shape the non-woven fabric fibers 50, and the non-woven fabric fibers 50 with the hot melt particles 60 and the solid particles 70 form a porous fiber structure 120a. The frame 400 in this embodiment functions to control the shape of the fiber structure 120a; however, in other embodiments, the frame 400 may not be configured in the mold 300 but the non-woven fabric fibers 50 are molded into the fiber structure 120a instead, which will not be limited by the invention.

Figure 1E:
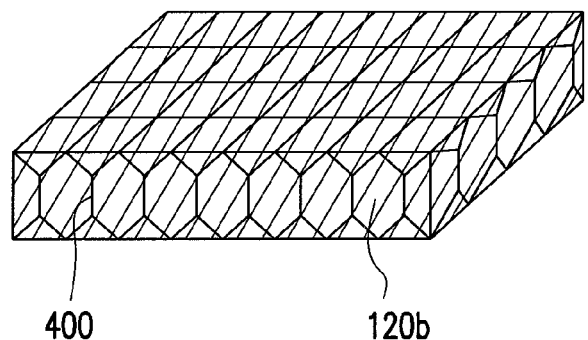

After the fiber structure 120a is formed, the fiber structure 120a is heated so that the hot melt particles 60 of FIG. 1B are bonded with the non-woven fabric fibers 50, and the solid particles 70 of FIG. 1B are bonded with the hot melt particles 60 for completing the fabrication of the non-woven fabric 120b of FIG. 1E. In practical operation, the sequence of the steps of molding the non-woven fabric fibers 50 for shaping, bonding the hot melt particles 60 with the non-woven fabric fibers 50, and bonding the solid particles 70 with the hot melt particles 60 are not particularly specified, and may be adjusted by request. For instance, the hot melt particles 60 may be bonded with the non-woven fabric fibers 50 first, then the solid particles 70 are bonded with the hot melt particles 60, and afterwards, the non-woven fabric fibers 50 are molded for shaping.

In this embodiment, the method for bonding the hot melt particles 60 with the non-woven fabric fibers 50 and bonding the solid particles 70 with the hot melt particles 60 includes, for example, heating the hot melt particles 60, the non-woven fabric fibers 50, and the solid particles 70 at the same time, so as to complete the bonding of the hot melt particles 60, the non-woven fabric fibers 50, and the solid particles 70 in the same heating step. The heating step is carried out by baking, ultrasound or other proper manners, which will not be limited by the invention.

The material of the non-woven fabric fibers 50 and the hot melt particles 60 may be plastic, and the melting point of the non-woven fabric fibers 50 is higher than that of the hot melt particles 60. The heating temperature in the above heating step is between the melting point of the non-woven fabric fibers 50 and the melting point of the hot melt particles 60, so that the hot melt particles 60 are melted to be bonded with the non-woven fabric fibers 50 and the solid particles 70. The non-woven fabric fibers 50 have a relatively high melting point and will not be melted at the heating temperature, so as to support the entire structure. For instance, the material of the non-woven fabric fibers 50 may be polypropylene (PP) with the melting point of about 180° C., and the material of the hot melt particles 60 may be polyethylene (PE) with the melting point of about 127° C. The material of the non-woven fabric fibers 50 may also be poly vinyl chloride (PVC), polystyrene (PS), PE, or rayon fibers, which will not be limited by the invention. In addition, a weight percent of the hot melt particles 60 to the entire structure is, for example, 7% to 9%, so as to gain a better bonding capability and structure strength; however, in other embodiments, the weight percent of the hot melt particles 60 may also be properly adjusted by request.

Furthermore, when the solid particles 70 are bonded with the hot melt particles 60 and the hot melt particles 60 are bonded with the non-woven fabric fibers 50, the catalyst particles may also be bonded with the hot melt particles 60 for producing the gas. For instance, the solid particles 70 in this embodiment may be metal particles or metal hydride particles like Sodium Borohydride (NaBH$_4$), Magnesium Hydride (MgH$_2$), Calcium Hydride (CaH$_2$), or Aluminium (Al) powder, the catalyst particles may be Carbonyl Chloride (CoCl$_2$), Cobalt Sulfate (CoSO$_4$), Iron(II) Chloride (FeCl$_2$), Nickel(II) Chloride (NiCl$_2$), or other catalysts containing Iron (Fe), Cobalt (Co), Nickel (Ni), Ruthenium (Ru), or Platinum (Pt), and the produced gas is hydrogen gas.

Figure 2:
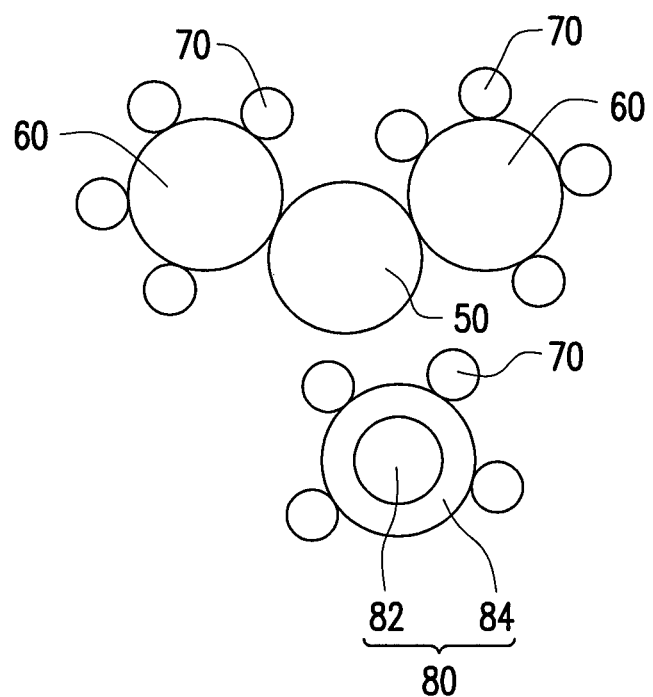
FIG. 2 is a schematic view of a non-woven fabric according to another embodiment of the invention.

FIG. 2 is a schematic view of a non-woven fabric according to another embodiment of the invention. Referring to FIG. 2, in the fabricating process of FIGS. 1A to 1E, a plurality of core-sheath fibers 80 may be mixed with the non-woven fabric fibers 50. Each of the core-sheath fibers 80 includes a core layer 82 and a sheath layer 84, in which the sheath layer 84 wraps the core layer 82. In addition to bonding the solid particles 70 with the hot melt particles 60 of FIG. 1B, the solid particles 70 may be bonded with the sheath layer 84 to form the structure having the non-woven fabric fibers 50 and the core-sheath fiber 80 of FIG. 2. In this embodiment, the material of the core layer 82 and the sheath layer 84 is plastic, the melting point of the non-woven fabric fibers 50 is higher than that of the sheath layer 84, and the melting point of the core layer 82 is higher than that of the sheath layer 84. The heating temperature in the above heating step needs to fall between the melting point of the non-woven fabric fibers 50 and the melting point of the hot melt particles 60, and meanwhile fall between the melting point of the core layer 82 and the melting point of the sheath layer 84, so that the hot melt particles 60 are melted to be bonded with the non-woven fabric fibers 50 and the solid particles 70, and the sheath layer 84 is melted to be bonded with the solid particles 70. The non-woven fabric fibers 50 and the core layer 82 have a relatively high melting point and will not be melted so as to support the entire structure. For instance, the material of the core layer 82 may be PP with the melting point of about 180° C., and the material of the sheath layer 84 may be PE with the melting point of about 127° C. It needs to be additionally explained that, in the embodiment of FIG. 2, the plurality of core-sheath fibers 80 are mixed in the non-woven fabric fibers 50. However, the non-woven fabric fiber may also be the core-sheath fiber that has a core layer and a sheath layer likewise, and the melting point of the core layer is higher than that of the hot melt particles and the sheath layer.

Figure 3A:
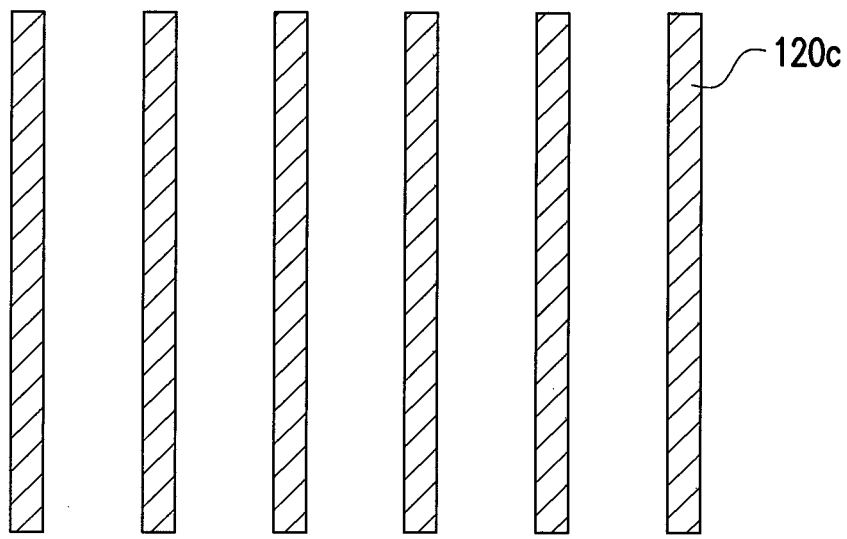
FIGS. 3A and 3B are flow charts of a method for fabricating a non-woven fabric apparatus according to an embodiment of the invention.
Figure 3B:
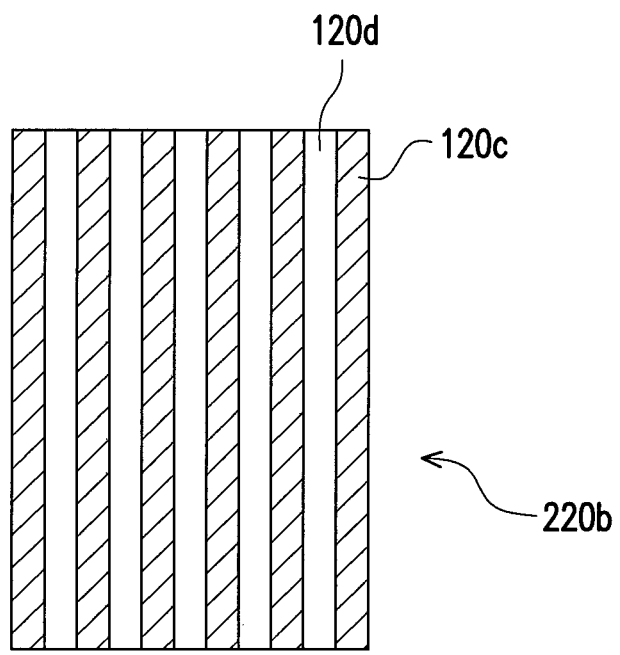

FIGS. 3A and 3B are flow charts of a method for fabricating a non-woven fabric apparatus according to an embodiment of the invention. Referring to FIG. 3A, in this embodiment, the non-woven fabric 120b containing the non-woven fabric fibers 50, the hot melt particles 60, and the solid particles 70 is used to form a plurality of non-woven fabric units 120c. For example, the non-woven fabric is used to fabricate a plurality of non-woven fabric units 120c in the shape of a tablet, plate, or other geometrical shapes (note: the constitution of the non-woven fabric 120b is the same as that of the non-woven fabric units 120c). Then, in FIG. 3B, the non-woven fabric units 120c and a plurality of waterproof films 120d are stacked alternately to form the non-woven fabric apparatus 220b. Since the non-woven fabric units 120c of the non-woven fabric apparatus 220b are separated by the waterproof films 120d, after the liquid that reacts with the solid particles 70 to produce the gas enters the non-woven fabric apparatus 220b, the liquid is separated by the waterproof films 120d, and may not concentrate at a specific position inside the non-woven fabric apparatus 220b, so that the liquid may react with the solid particles 70 in each of the non-woven fabric units 120c uniformly to produce the gas. However, the invention is not limited thereto, and the waterproof films 120d may not be configured.

Figure 4A:
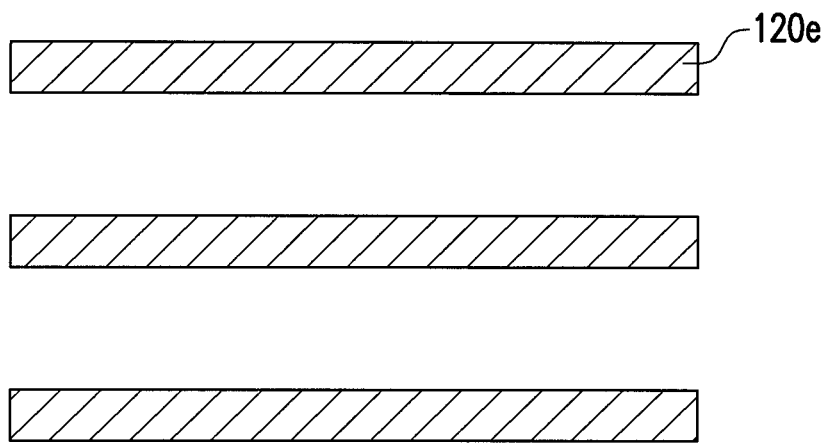
FIGS. 4A and 4B are flow charts of a method for fabricating a non-woven fabric apparatus according to an embodiment of the invention.
Figure 4B:
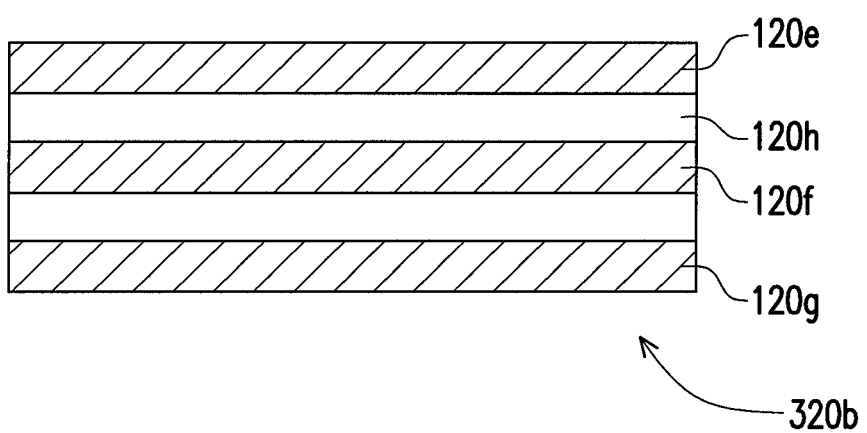

FIGS. 4A and 4B are flow charts of a method for fabricating a non-woven fabric apparatus according to another embodiment of the invention. Referring to FIG. 4A, in this embodiment, the non-woven fabric 120b containing the non-woven fabric fibers 50, the hot melt particles 60, and the solid particles 70 may be used to form a plurality of non-woven fabric units 120e, 120f, and 120g. Then, in FIG. 4B, the non-woven fabric units 120e, 120f, and 120g and a plurality of permeable membranes 120h are stacked alternately to form the non-woven fabric apparatus 320b. Under this configuration, the non-woven fabric units 120e, 120f, and 120g may be respectively added with fibers having different properties to acquire different absorbent or repellent characteristics.

For instance, the non-woven fabric unit 120e and the non-woven fabric unit 120g may be added with natural fibers such as cotton fiber, linen fiber, wood pulp fiber, wool fiber, and silk, so that the non-woven fabric unit 120e and the non-woven fabric unit 120g acquire the absorbent characteristic, and the non-woven fabric unit 120f is added with synthetic fibers such as viscose fiber, lyocell fiber, and rayon fiber, so that the non-woven fabric unit 120f acquires the repellent characteristic.

The non-woven fabric units 120e, 120f, and 120g of the non-woven fabric apparatus 320b are separated by the permeable membranes 120h, and after the liquid that reacts with the solid particles 70 to produce the gas enters the non-woven fabric apparatus 320b through the non-woven fabric unit 120e, the liquid sequentially passes through the non-woven fabric units 120e, 120f, and 120g to undergo reaction via the permeable membranes 120h. When the liquid passes through the absorbent non-woven fabric unit 120e, a high hydrogen generation rate is obtained, so that the fuel cell reaches a specific voltage and starts supplying power. Then, when the liquid passes through the repellent non-woven fabric unit 120f, a slow hydrogen generation rate is obtained, to achieve a stable hydrogen producing effect. At last, when the liquid passes through the hydrophilic non-woven fabric unit 120g, a high hydrogen generation rate is obtained, and thus the reaction time is effectively controlled to avoid a long time of hydrogen gas generation which does not conform to the safety specification of the fuel cell.

In addition to the above method, in other embodiments, the solid particles 70 may also be deposited on a moving screen and drained or dried to remove the moisture, and then added with an adhesive to be mixed in the non-woven fabric fiber. The processing technique of electrospun polymer fibers may be applied, in which the polymer solution and the solid particles 70 are mixed to serve as a raw material of electrospun polymer fibers to form the non-woven fabric containing the solid particles 70. Furthermore, bundles of fibers and the solid particles 70 may be mixed by means of adhesion, and then a carding machine having fine-tooth rollers is used to card the fibers into a cotton mesh, so as to make the solid particles 70 uniformly mixed in the non-woven fabric fiber. Furthermore, the solid particles 70 and the non-woven fabric fiber may be mixed through an air flow. In addition, the polymer plastic particles may be melted and spun into fibers, and mixed with the solid particles 70, and then cooled down on a conveyer belt to become a cotton mesh mixed with the solid particles 70.

The non-woven fabric 120b and the non-woven fabric apparatus 220b, 320b may be used for producing gas, so as to provide the gas required by the FC.

Hereinafter, a gas fuel generation apparatus using the non-woven fabric 120b and a gas fuel generation method are illustrated in the following with the accompanying drawings.

Figure 5:
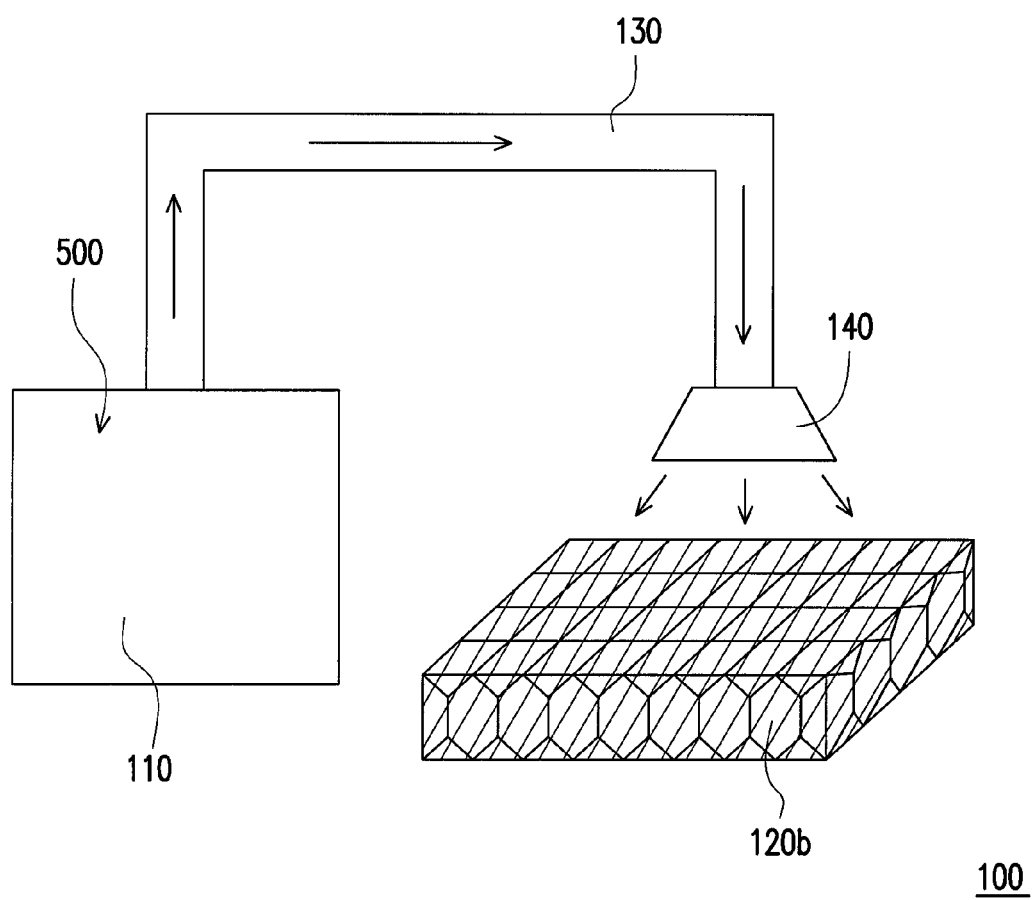
FIG. 5 is a schematic view of a gas generation apparatus using the non-woven fabric of FIG. 1E.

FIG. 5 is a schematic view of a gas fuel generation apparatus using the non-woven fabric of FIG. 1E. Referring to FIG. 5, the gas generation apparatus 100 of this embodiment is applicable to provide a gas, e.g., provide the gas required by the FC or for other purposes. The gas generation apparatus 100 includes a containing tank 110, the non-woven fabric 120b fabricated by the processes of FIGS. 1A to 1E, and the guiding structure 130. The containing tank 110 is used for containing a liquid 500. The guiding structure 130 is configured between the containing tank 110 and the non-woven fabric 120b. The guiding structure 130 is used for guiding the liquid 500 in the containing tank 110 to the non-woven fabric 120b, so that the liquid 500 reacts with the solid particles 70 of the non-woven fabric 120b (as shown in FIG. 1B) to produce the gas.

Therefore, when the liquid 500 is guided to the non-woven fabric 120b, the liquid 500 may directly react with the solid particles 70 distributed in the non-woven fabric 120b to improve the gas generation efficiency. Furthermore, the produced gas may be directly exhausted for the FC to generate power through the pores of the non-woven fabric 120b. The liquid 500 in this embodiment is, for example, liquid water, malic acid, citric acid, Sulfuric acid ($H_2SO_4$), an aqueous solution of Sodium Carbonate $NaHCO_3$, or an aqueous solution of Calcium Carbonate $CaCO_3$, for reacting with the solid particles 70 to produce the gas fuel (e.g., hydrogen gas).

In details, the gas generation apparatus 100 of this embodiment further includes a sprayer apparatus 140. The sprayer apparatus 140 is configured at an end of the guiding structure 130, and the sprayer apparatus 140 sprays the liquid 500 on the non-woven fabric 120b, so that the liquid 500 may uniformly permeate the non-woven fabric 120b.

Figure 6A:
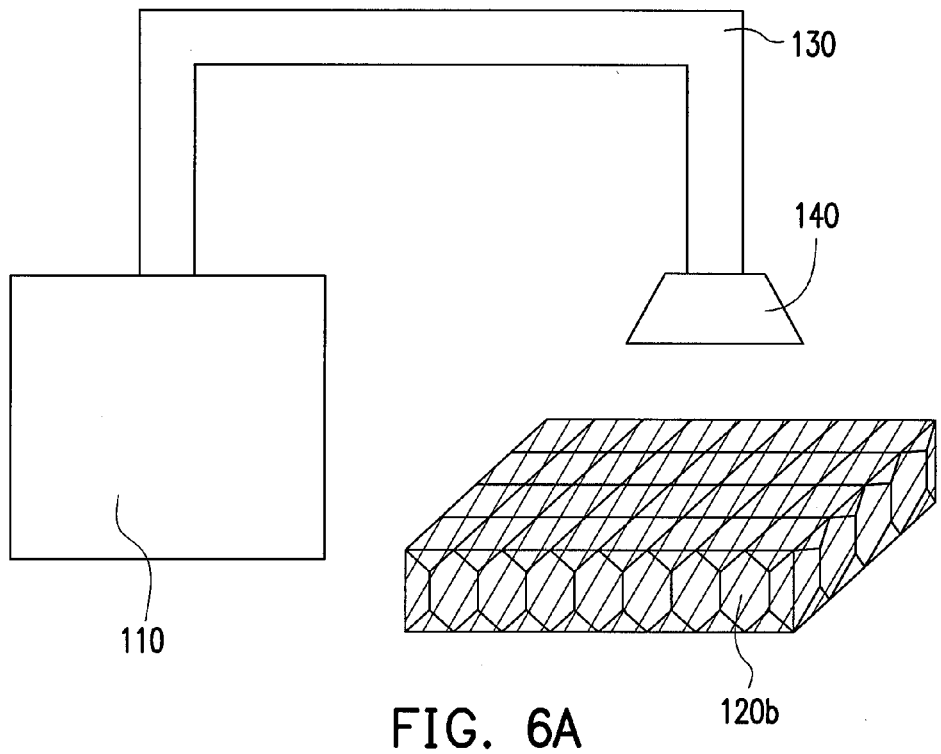
FIGS. 6A and 6B are schematic views of using the gas generation apparatus of FIG. 5 to produce a gas.
Figure 6B:
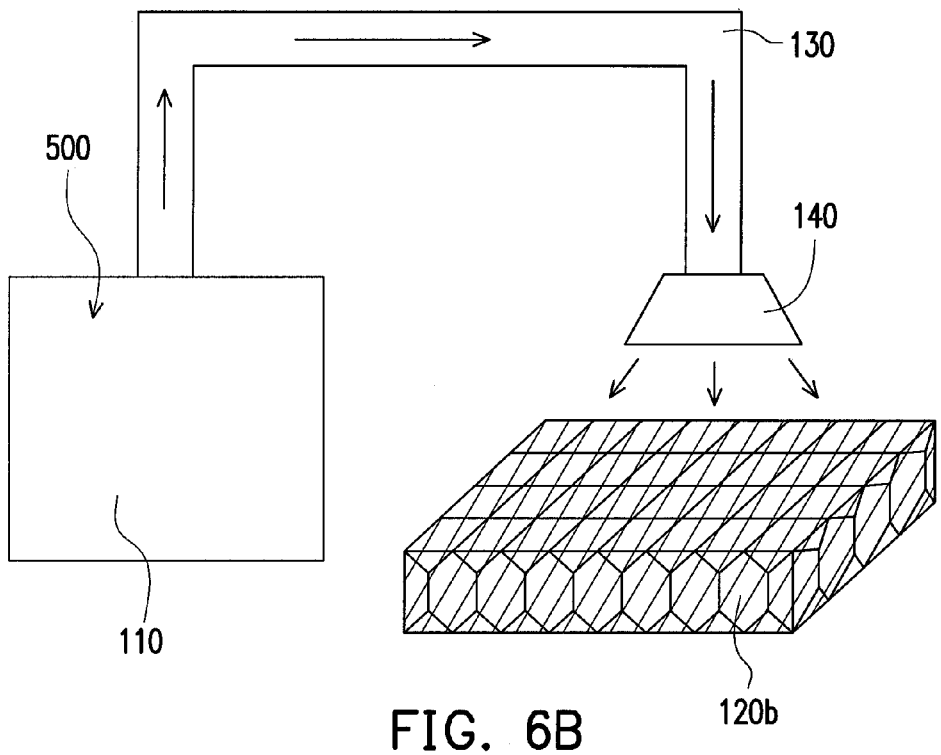

Hereinafter, the gas fuel generation apparatus 100 in FIG. 5 is taken as an example to illustrate the method of using the gas generation apparatus 100 to produce a gas. FIGS. 6A and 6B are schematic views of using the gas generation apparatus in FIG. 5 to produce a gas. Referring to FIG. 6A, firstly, a non-woven fabric 120b is provided. Then, referring to FIG. 6B, the guiding structure 130 guides the liquid 500 into the non-woven fabric 120b, so that the solid particles 70 (as shown in FIG. 1B) reacts with the liquid 500 to produce a gas, and the produced gas may be exhausted for the FC to generate power through the pores of the non-woven fabric 120b or for other purposes (e.g., cosmetic or medical treatment).

In specific, in the case that the hot melt particles 60 of the non-woven fabric 120b (as shown in FIG. 1B) are bonded with the solid particles 70 such as Sodium Borohydride ($NaBH_4$), Magnesium Hydride ($MgH_2$), Calcium Hydride ($CaH_2$), or Aluminium (Al) powder and the catalyst such as Carbonyl Chloride ($CoCl_2$), Cobalt Sulfate ($CoSO_4$), Iron(II) chloride ($FeCl_2$), or Nickel(II) Chloride ($NiCl_2$), the liquid 500 may be liquid water, malic acid, citric acid, Sulfuric acid ($H_2SO_4$), an aqueous solution of Sodium Carbonate ($NaHCO_3$), or an aqueous solution of Calcium Carbonate ($CaCO_3$), so that the liquid 500 and the solid particles 70 react with each other in the presence of the catalyst.

If the hot melt particles 60 of the non-woven fabric 120b (as shown in FIG. 1B) are bonded with the solid particles 70 such as Sodium Borohydride ($NaBH_4$), Magnesium Hydride ($MgH_2$), Calcium Hydride ($CaH_2$), or Aluminium (Al) powder but are not bonded with the catalyst particles. In addition to the liquid water, malic acid, citric acid, Sulfuric acid ($H_2SO_4$), an aqueous solution of Sodium Carbonate ($NaHCO_3$), or an aqueous solution of Calcium Carbonate ($CaCO_3$), the liquid 500 may further include an aqueous solution of a catalyst such as aqueous solution of Carbonyl Chloride ($CoCl_2$), Nickel(II) Chloride ($NiCl_2$), Iron(II) chloride ($FeCl_2$), Cobalt Sulfate ($CoSO_4$) or Sodium chloride (NaCl), so that the liquid 500 and the solid particles 70 react with each other in the presence of the catalyst.

In this embodiment, the non-woven fabric 120b reacts with the liquid 500 to produce the gas, but the invention is not limited thereto, and the non-woven fabric apparatus 220b, 320b in FIG. 3B or FIG. 4B may also be used to replace the non-woven fabric 120b that reacts with the liquid 500.

In view of the above, in the embodiments of the invention, the hot melt particles are bonded with the non-woven fabric fiber, and the solid particles are bonded with the hot melt particles, so that the hot melt particles, the non-woven fabric fiber, and the solid particles together form the non-woven fabric. When the liquid is guided to the non-woven fabric, the liquid directly reacts with the solid particles in the non-woven fabric, thereby improving the gas generation efficiency. Furthermore, the pores of the non-woven fabric remain unchanged in the structure during the reaction, so the passage of the gas exhausted from the non-woven fabric also remains unchanged, and the gas generation rate is more stable.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A non-woven fabric, reacting with a liquid to produce a gas, comprising:
   at least one non-woven fabric fiber, having a first melting point;
   a plurality of hot melt particles, bonded with the non-woven fabric fiber and having a second melting point, wherein the first melting point is higher than the second melting point; and a plurality of solid particles, at least part of the solid particles bonded with the hot melt particles; and wherein each of the solid particles is a metal particle or a metal hydride particle, and the gas is hydrogen gas.

2. The non-woven fabric according to claim 1, wherein a material of the at least one non-woven fabric fiber and the hot melt particles is plastic.

3. The non-woven fabric according to claim 1, further comprising a plurality of catalyst particles.

4. The non-woven fabric according to claim 1, wherein the non-woven fabric further comprises a plurality of core-sheath fibers, and each of the core-sheath fibers comprises:
a core layer, having a third melting point; and
a sheath layer, wrapping the core layer and having a fourth melting point, wherein the first melting point and the third melting point are higher than the fourth melting point, and a part of the solid particles are bonded with the sheath layer.

5. The non-woven fabric according to claim 1, wherein the at least one non-woven fabric fiber is a core-sheath fiber, and the core-sheath fiber comprises:
a core layer, having the first melting point; and
a sheath layer, wrapping the core layer and having a fifth melting point, wherein the first melting point is higher than the fifth melting point, and a part of the solid particles are bonded with the sheath layer.

6. The non-woven fabric according to claim 1, wherein a weight percent of the hot melt particles is greater than or equal to 7% and smaller than or equal to 9%.

7. A method for fabricating a non-woven fabric, wherein the non-woven fabric reacts with a liquid to produce a gas, the method comprising:
providing at least one non-woven fabric fiber, wherein the at least one non-woven fabric fiber has a first melting point;
bonding a plurality of hot melt particles with the at least one non-woven fabric fiber, wherein the hot melt particles has a second melting point, and the first melting point is higher than the second melting point;
bonding a plurality of solid particles with the hot melt particles; and
shaping the at least one non-woven fabric fiber; and wherein each of the solid particles is a metal particle or a metal hydride particle, and the gas is hydrogen gas.

8. The method for fabricating the non-woven fabric according to claim 7, further comprising:
bonding a plurality of catalyst particles with the hot melt particles.

9. The method for fabricating the non-woven fabric according to claim 7, wherein a method of shaping the at least one non-woven fabric fiber comprises:
placing the at least one non-woven fabric fiber in a mold; and
molding the at least one non-woven fabric fiber.

10. The method for fabricating the non-woven fabric according to claim 7, wherein a method of bonding the hot melt particles with the at least one non-woven fabric fiber and bonding the solid particles with the hot melt particles comprises:
heating the hot melt particles, the at least one non-woven fabric fiber, and the solid particles.

11. The method for fabricating the non-woven fabric according to claim 7, wherein a material of the at least one non-woven fabric fiber and the hot melt particles is plastic.

12. The method for fabricating the non-woven fabric according to claim 7, further comprising:

mixing a plurality of core-sheath fibers and the at least one non-woven fabric fiber, wherein each of the core-sheath fibers comprises:
a core layer, having a third melting point; and
a sheath layer, wrapping the core layer and having a fourth melting point, wherein the first melting point and the third melting point are higher than the fourth melting point; and
bonding a part of the solid particles with the sheath layer.

13. A gas generation apparatus, comprising:
a containing tank, for containing a liquid;
at least one non-woven fabric unit, each of non-woven fabric units comprising:
at least one non-woven fabric fiber, having a first melting point;
a plurality of hot melt particles, bonded with the at least one non-woven fabric fiber and having a second melting point, wherein the first melting point is higher than the second melting point; and
a plurality of solid particles, at least part of the solid particles bonded with the hot melt particles; and
a guiding structure, configured between the containing tank and the non-woven fabric unit, wherein the guiding structure is used for guiding the liquid in the containing tank to the non-woven fabric unit, so that the liquid reacts with the solid particles to produce a gas; and wherein each of the solid particles is a metal particle or a metal hydride particle, and the gas is hydrogen gas.

14. The gas generation apparatus according to claim 13, further comprising a sprayer apparatus, configured at an end of the guiding structure, for spraying the liquid on the at least one non-woven fabric unit.

15. The gas generation apparatus according to claim 13, wherein the at least one non-woven fabric unit further comprises a plurality of catalyst particles bonded with the hot melt particles.

16. The gas generation apparatus according to claim 13, wherein a material of the at least one non-woven fabric fiber and the hot melt particles is plastic.

17. The gas generation apparatus according to claim 15, wherein a number of the at least one non-woven fabric unit is multiple, and the gas generation apparatus further comprises a plurality of waterproof films alternately configured between the non-woven fabric units.

18. The gas generation apparatus according to claim 13, wherein a number of the at least one non-woven fabric unit is multiple, a part of the non-woven fabric units comprise a plurality of absorbent fibers, the other part of the non-woven fabric units comprise a plurality of repellent fibers, and the gas generation apparatus further comprises a plurality of permeable membranes alternately configured between the non-woven fabric units.

19. The gas generation apparatus according to claim 13, wherein the at least one non-woven fabric unit further comprises a plurality of core-sheath fibers, each of the core-sheath fibers comprising:
a core layer, having a third melting point; and
a sheath layer, wrapping the core layer and having a fourth melting point, wherein the first melting point and the third melting point are higher than the fourth melting point, and a part of the solid particles are bonded with the sheath layer.

20. The gas generation apparatus according to claim 13, wherein the at least one non-woven fabric fiber is a core-sheath fiber, and the core-sheath fiber comprises:
a core layer, having the first melting point; and a sheath layer, wrapping the core layer and having a fifth melting point, wherein the first melting point is higher than the fifth melting point, and a part of the solid particles are bonded with the sheath layer.

21. The gas generation apparatus according to claim 13, wherein a weight percent of the hot melt particles is greater than or equal to 7% and smaller than or equal to 9%.

* * * * *